United States Patent
Yoo et al.

(10) Patent No.: US 10,282,160 B2
(45) Date of Patent: *May 7, 2019

(54) APPARATUS AND METHOD FOR GENERATING AUDIO DATA, AND APPARATUS AND METHOD FOR PLAYING AUDIO DATA

(71) Applicants: Electronics and Telecommunications Research Institute, Daejeon (KR); NIPPON HOSO KYOKAI, Tokyo (JP)

(72) Inventors: Jae Hyoun Yoo, Daejeon (KR); Tae Jin Lee, Daejeon (KR); Kyeong Ok Kang, Daejeon (KR); Kaoru Watanabe, Tokyo (JP); Satoshi Oode, Tokyo (JP); Ikuko Sawaya, Tokyo (JP)

(73) Assignees: Electronics and Telecommunications Research Institute, Daejeon (KR); NIPPON HOSO KYOKAI, Tokyo (JP)

(*) Notice: Subject to any disclaimer, the term of this patent is extended or adjusted under 35 U.S.C. 154(b) by 10 days.

This patent is subject to a terminal disclaimer.

(21) Appl. No.: 15/803,464

(22) Filed: Nov. 3, 2017

(65) Prior Publication Data

US 2018/0060019 A1 Mar. 1, 2018

Related U.S. Application Data (63) Continuation of application No. 14/434,484, filed as application No. PCT/KR2013/009112 on Oct. 11, 2013, now Pat. No. 9,836,269.

(30) Foreign Application Priority Data

Oct. 11, 2012 (KR) .................... 10-2012-0112984
Aug. 28, 2013 (KR) .................... 10-2013-0102544
Oct. 11, 2013 (KR) .................... 10-2013-0121247

(51) Int. Cl.
*G06F 3/16* (2006.01)
*H04S 3/00* (2006.01)
(Continued)

(52) U.S. Cl.
CPC ............. *G06F 3/16* (2013.01); *G06F 3/165* (2013.01); *G10L 19/167* (2013.01); *H04S 3/008* (2013.01);
(Continued)

(58) Field of Classification Search
CPC ............. H04S 2400/11; H04S 2420/03; H04S 2420/01; H04S 7/301; H04S 3/008;
(Continued)

(56) References Cited

U.S. PATENT DOCUMENTS 4,622,597 A 11/1986 Hirota et al.
7,123,731 B2* 10/2006 Cohen .................... H04S 7/301
381/303

(Continued)

FOREIGN PATENT DOCUMENTS

JP 2009500659 A 1/2009
JP 2009151785 A 7/2009
(Continued)

OTHER PUBLICATIONS

US 7,908,148 B2, 03/2011, Pang et al. (withdrawn)
(Continued)

*Primary Examiner* — Akelaw Teshale
(74) *Attorney, Agent, or Firm* — William Park & Associates Ltd.

(57) ABSTRACT

An apparatus and method for generating audio data and an apparatus and method for playing audio data may be disclosed, in which the apparatus for playing the audio data may extract a descriptor related to a multichannel audio signal from a bitstream generated by the apparatus for
(Continued)

generating the audio data, and play the multichannel audio signal, based on the extracted descriptor, and the descriptor may include information on an audio signal included in the multichannel audio signal.

16 Claims, 7 Drawing Sheets

(51) Int. Cl.
*G10L 19/16* (2013.01)
*G10L 19/008* (2013.01)

(52) U.S. Cl.
CPC ......... *G10L 19/008* (2013.01); *H04S 2400/11* (2013.01)

(58) Field of Classification Search
CPC .......... H04S 7/30; H04S 2400/01; H04S 5/00; H04S 2400/03; H04S 2420/07; H04S 5/005; H04S 2420/13; H04S 7/304; H04S 2400/15; H04S 3/002; H04S 3/004; H04S 7/302
USPC ....... 381/17, 18, 303, 307, 119, 22, 23, 300, 381/309, 80
See application file for complete search history.

(56) References Cited

U.S. PATENT DOCUMENTS

| 7,860,260 B2* | 12/2010 | Kim ........................ H04S 7/302 381/17 |
| 9,451,378 B2* | 9/2016 | Park ........................ H04S 3/008 |
| 2005/0244012 A1* | 11/2005 | Asada ..................... H04S 7/301 381/56 |
| 2006/0133628 A1* | 6/2006 | Trivi ..................... G10H 1/0066 381/310 |
| 2006/0256970 A1* | 11/2006 | Asada ..................... H04S 7/301 381/17 |
| 2006/0280311 A1 | 12/2006 | Beckinger et al. |
| 2009/0067670 A1 | 3/2009 | Johnson et al. |
| 2009/0238371 A1* | 9/2009 | Rumsey ............... H04R 29/001 381/58 |
| 2010/0114582 A1* | 5/2010 | Beack ....................... H04S 7/30 704/500 |
| 2010/0135510 A1* | 6/2010 | Yoo ........................ G10L 19/008 381/300 |
| 2010/0145487 A1 | 6/2010 | Oh et al. |
| 2011/0013790 A1 | 1/2011 | Hilpert et al. |
| 2011/0064249 A1* | 3/2011 | Jang ...................... G11B 27/034 381/119 |
| 2011/0202356 A1* | 8/2011 | Kim ...................... G10L 19/008 704/500 |
| 2012/0057715 A1 | 3/2012 | Johnston et al. |
| 2012/0117249 A1 | 5/2012 | Jung et al. |
| 2012/0283593 A1 | 11/2012 | Searchfield et al. |
| 2013/0129103 A1* | 5/2013 | Donaldson ............. G10K 11/16 381/71.1 |
| 2013/0202129 A1* | 8/2013 | Kraemer ................. G10L 19/00 381/77 |
| 2015/0245321 A1 | 8/2015 | Jiang et al. |
| 2015/0281842 A1 | 10/2015 | Yoo et al. |

FOREIGN PATENT DOCUMENTS

| KR | 1020090039642 A | 4/2009 |
| KR | 20090055399 A | 6/2009 |
| KR | 1020100063120 A | 6/2010 |
| KR | 101003415 B1 | 12/2010 |
| KR | 20120071072 A | 7/2012 |
| WO | 2006004048 A1 | 1/2006 |
| WO | 2007027055 A1 | 3/2007 |

OTHER PUBLICATIONS

"Performance Requirements for an Advanced Multichannel Stereophonic Sound System for Use With or Without ccompanying Picture", Recommendation ITU-R BS.1909, International Telecommunication Union, Jan. 2012, Geneva, Switzerland.

* cited by examiner

APPARATUS AND METHOD FOR GENERATING AUDIO DATA, AND APPARATUS AND METHOD FOR PLAYING AUDIO DATA

CROSS-REFERENCE TO RELATED APPLICATION

This application is a continuation application of U.S. application Ser. No. 14/434,484, filed on Apr. 9, 2015, and claims the priority benefit of Korean Patent Applications No. 10-2012-0112984, filed on Oct. 11, 2012, No. 10-2013-0102544, filed on Aug. 28, 2013, and No. 10-2013-0121247, filed on Oct. 11, 2013, in the Korean Intellectual Property Office, the disclosure of which is incorporated herein by reference.

BACKGROUND

1. Field of the Invention

The present invention relates to a method for generating audio data and a method for playing audio data.

2. Description of the Related Art

In recent times, various audio technologies related to an audio system as well as a next-generation television (TV) system such as a three-dimensional (3D) TV or an ultra high definition (UHD) TV are undergoing developments. Such technologies may refer to technology of a multichannel audio system, using a greater number of loud speakers than a 5.1 channel scheme defined in International Telecommunication Union Radio communication Sector (ITU-R) recommend BS.775 standard.

However, an issue may arise in the recently disclosed multichannel audio system in that a multichannel audio signal may not be played properly unless a predetermined audio device is used because the multichannel audio system represents a multichannel audio signal, exclusively.

Accordingly, defining a manner of representing or describing multichannel audio representing various multichannel audio signals and applicable to a next generation audio system may be required.

SUMMARY

According to an aspect of the present invention, there is provided an apparatus for playing audio data, the apparatus including a descriptor extractor to extract a descriptor associated with a multi channel audio signal from a bitstream generated by an apparatus for generating audio data, and a player to play the multi channel audio signal, based on the extracted descriptor, wherein the descriptor includes information associated with an audio signal included in the multi channel audio signal.

The descriptor may include at least one of a sound essence descriptor, a sound-field configuration descriptor, and a sound channel descriptor.

The sound channel descriptor may include at least one of a channel label descriptor and a channel position descriptor.

The channel label descriptor may include information associated with at least one of an allocation number of an audio signal, an audio channel label, and a type of a channel component object.

The audio channel label may include at least one of a horizontal channel label, a vertical channel label, a distance channel label, and an object channel label, wherein the type of the channel component object includes at least one of a nominal frequency range of a channel component, a type of channel component directivity, and moving information associated with a moving object.

The channel position descriptor may include information associated with at least one of an allocation number of an audio signal, spatial position data, distance position data, a tolerance of a spatial position, a tolerance of a distance position, and a type of a channel component object.

The spatial position data may include information associated with at least one of an azimuth angle and an elevation angle representing a position in an audio signal playing space.

The information associated with a tolerance of the spatial position may include information associated with at least one of a horizontal tolerance, a vertical tolerance, and sound image localization based on a play time.

The information associated with the tolerance of the distance position may include at least one of information associated with a tolerance of the spatial position may include information associated with at least one of a horizontal tolerance, a vertical tolerance, and sound image localization based on a play time.

The type of the channel component object may include at least one of a nominal frequency range of a channel component and a type of channel component directivity.

The apparatus for playing the audio data may further include a displayer to display, on a screen, information included in the descriptor.

According to another aspect of the present invention, there is provided an apparatus for generating audio data, the apparatus including a descriptor generator to generate a descriptor for displaying a multi channel audio signal, and a bitstream generator to generate the descriptor and the multi channel audio signal in a form of a bitstream.

The bitstream generator may encode and multiplex the descriptor and the multichannel audio signal in order to generate a bitstream.

The apparatus for generating the audio signal may further include a transmitter to transmit the generated bitstream to an apparatus for playing audio signal.

According to still another aspect of the present invention, there is provided a method for playing audio data, the method including extracting a descriptor for displaying a multi channel audio signal from a bitstream generated by an apparatus for generating audio data, and playing the multi channel audio signal, based on the extracted descriptor, wherein the descriptor comprises information associated with an audio signal included in the multi channel audio signal.

According to yet another aspect of the present invention, there is provided a method for generating audio data, the method including generating a descriptor for displaying a multi channel audio signal, and generating the descriptor and the multi channel audio signal in a form of a bitstream, wherein the descriptor comprises information associated with an audio signal included in the multi channel audio signal.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
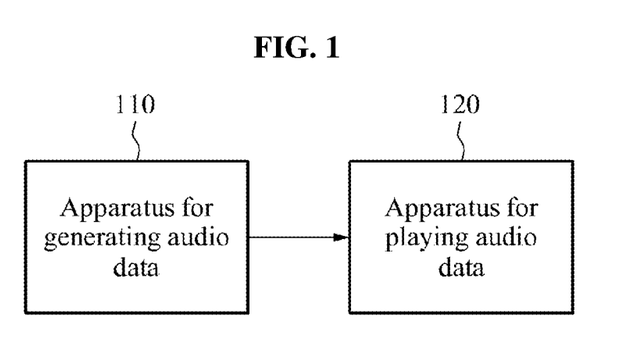
FIG. 1 is a diagram illustrating an operation of playing generated audio data according to an embodiment of the present invention.

FIG. 1 is a diagram illustrating an operation of playing generated audio data according to an embodiment of the present invention.

Referring to FIG. 1, an apparatus 110 for generating audio data may generate audio data including a multichannel audio signal. The multichannel audio signal may include a channel-based audio signal and an object-based audio signal. For example, the multichannel audio signal may represent multichannel sound content, such as a 10.2 channel, a 22.2 channel, and the like. The apparatus 110 for generating the audio data may generate audio data and metadata necessary for playing the audio data in a form of a bitstream. The metadata may include a descriptor for representing a multichannel audio signal. The descriptor may include information associated with a position at which an audio signal included in the multichannel audio signal is played, and the like. The descriptor may include information indicating an audio channel and a position at which the audio channel is played, and the like. The apparatus 110 for generating the audio data may transmit the generated bitstream to an apparatus 120 for playing audio data.

The apparatus 120 for playing the audio data may extract the multichannel audio signal and the metadata from the bitstream. The apparatus 120 for playing the audio data may play the multichannel audio signal, based on the descriptor included in the metadata. For example, the apparatus 120 for playing the audio data may render the multichannel audio signal, based on play information included in the descriptor. The apparatus 120 for playing the audio data may mix the multichannel audio signal, based on play conditions of the apparatus 120 for playing the audio data, and play the mixed multichannel audio signal.

Figure 2:
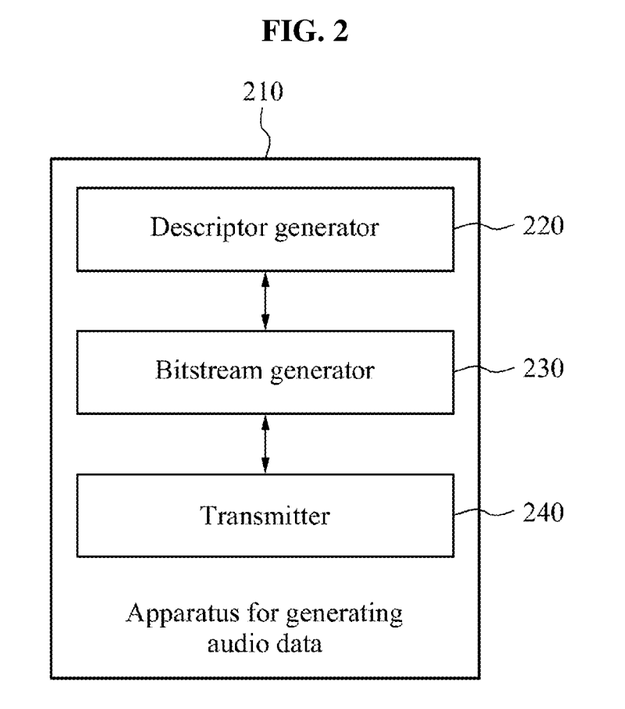
FIG. 2 is a diagram illustrating a detailed configuration of an apparatus for generating audio data according to an embodiment of the present invention.

FIG. 2 is a diagram illustrating a detailed configuration of an apparatus 210 for generating audio data according to an embodiment of the present invention.

Referring to FIG. 2, the apparatus 210 for generating the audio data may include a descriptor generator 220 and a bitstream generator 230. The apparatus 210 for generating the audio data may further include a transmitter 240.

The descriptor generator 220 may generate a descriptor for displaying a multichannel audio signal. The descriptor may include information associated with a position at which an audio signal included in the multichannel audio signal is played, and the like. The generated descriptor may be stored in a header of a multichannel audio format signal, using metadata, or stored in a plurality of headers of a plurality of audio channels configuring the multichannel audio signal.

The metadata may be divided into a plurality of types based on utility, and a basic structure may be defined to be applicable to configuring and exchanging multichannel sound content. For example, a basic structure descriptor may be used for producing and exchanging the multichannel sound content.

Hereinafter, the basic structure of the descriptor according to the present exemplary embodiment will be discussed.

Terms used in the descriptor may be defined in Table 1.

TABLE 1

| Terms | Description |
| --- | --- |
| Sound Channel | Configured by plurality of sound channel positions (directions) to be played Includes play frequency level characteristic and space-oriented characteristic (sound channel component object) Includes object-based audio signal |
| Type of Sound Channel Component Object | Represents plurality of sound channel signal components (play frequency level characteristic, space-oriented characteristic) |
| Sound-field configuration | Represents channel arrangement required for reproducing single sound space |
| Sound-field | Represents sound space established by sound field configuration |
| Sound Essence | Represents sound of TV/radio program |

Sound essence may refer to information associated with a representation related to a program, a representation or name related to a sound-field, and the like. The sound-field may be represented by a sound-field configuration having a hierarchical configuration. The sound-field configuration may be configured by a plurality of sound channels. The plurality of sound channels may be described by at least one representation from among a channel label and a channel position. The descriptor generator 220 may select a necessary descriptor, based on various scenarios in which multichannel sound content is exchanged.

The descriptor may include at least one of a sound essence descriptor, a sound-field configuration descriptor, and a sound channel descriptor.

The sound essence descriptor may include information associated with at least one of a program name, a type of sound essence, a name of a sound-field configuration, and a loudness value.

A configuration of the sound essence descriptor may be represented in Table 2.

TABLE 2

| Name of Descriptor | Subject of Description | Example |
| --- | --- | --- |
| Program name | Program title | Programme Title |
| Type of Sound essence (Sound-field) | Name of Type and Content of Sound essence | Complete mix |
| Name of Sound-field configuration | Name of defined multichannel sound arrangement or configuration | 22.2ch, 10.2ch, etc. |
| Loudness value | Loudness value | |

The sound-field configuration descriptor may include information associated with at least one of a name of a sound-field configuration, a number of audio channels, a multichannel sound arrangement description, a list of channel allocations, and a down-mixing coefficient. The sound-field configuration descriptor may describe multichannel arrangement data.

The configuration of the sound-field configuration descriptor according to the present exemplary embodiment may be represented in Table 3.

TABLE 3

| Name of Descriptor | Subject of Description | Example |
| --- | --- | --- |
| Name of Sound-field configuration | Name of defined multichannel sound arrangement | 22.2ch, 10.2ch, etc. |
| The number of channels | The total number of channel | 24 channels, 12 channels |
| Multichannel sound arrangement description | Numbers of horizontal and/or vertical channels | middle: 10, front: 5, side: 2, back: 3, top: 9, front: 3, side: 3, back: 3, bottom: 3, front: 3, side: 0, back: 0, LFE: 2 |
| List of channel allocation | Mapping of channel allocation | 1: Mid_L, 2: Mid_R, 3: Mid_C, 4: LFE 5: Mid_LS, 6: Mid_RS, |
| Down-mixing coefficient | Coefficients in order to down mix to conventional Sound-field (5.1ch, 2ch or 1ch) | |

The sound channel descriptor may include at least one of a channel label descriptor and a channel position descriptor.

A configuration of the sound channel descriptor according to the present exemplary embodiment may be represented in Table 4.

TABLE 4

| Name of Descriptor | Subject of Description | Example |
| --- | --- | --- |
| Indicator of Sound Channel descriptor | Indicator of Channel label data and Channel position data | 11: Channel label data [On]/Channel position data [On] |

The channel label descriptor may describe channel label data. The channel label descriptor may include information associated with at least one of an allocation number of an audio signal, an audio channel label, and a type of a channel component object.

The audio channel label may include at least one of a horizontal channel label, a vertical channel label, a distance channel label, and an object channel label.

The type of the channel component object may include at least one of a nominal frequency range of a channel component, a type of channel component directivity, and moving information of a moving object.

A configuration of the channel label descriptor according to the present exemplary embodiment may be represented in Table 5.

The channel position descriptor may describe channel position data. The channel position descriptor may include information associated with at least one of an allocation number of an audio signal, spatial position data, distance position data, a tolerance of a spatial position, a tolerance of a distance position, and a type of a channel component object.

The spatial position data may include information associated with at least one of an azimuth angle and an elevation angle indicating a position at which an audio signal is played.

The distance position data may represent a distance from a center of an audio signal playing space to a position at which an audio signal is played in the audio signal playing space.

The information associated with the tolerance of spatial position may include information associated with at least one of a horizontal tolerance, a vertical tolerance, and sound image localization based on a play time.

The information associated with the tolerance of distance position may include information associated with at least one of a distance from a center of an audio signal playing space to a position at which an audio signal is played in the audio signal playing space and moving information of a moving object.

The type of the channel component object may include at least one of a nominal frequency range and a type of channel component directivity.

TABLE 5

| Name of Descriptor | Subject of Description | Example |
| --- | --- | --- |
| Allocation number | Allocation number | 1: first channel, 2: second channel, . . . |
| Channel label (A label to indicate the intended channel for sound reproduction) | Horizontal Channel label | C: Center of screen, L: Left side of screen, Lc: Inner side on the left of the screen, Lw: Outer side on the left of screen |
| | Vertical Channel label | Mid: Middle layer, Tp: Top layer (above the listener's ear height), Bt: Bottom layer (under the listener's ear height) |
| | Distance Channel label | Near, Far |
| | Object Channel label | Vocal, Piano, Drum, etc |
| Type (Characteristics) of channel component object | Nominal frequency Range | Full: general channel, LFE: Low frequency effect channel (Include channel label or other?) |
| | Type of channel component directivity | /Direct/Diffuse/Surround (Include channel label or other?) |
| | Moving Information | Information for moving objects: (Time, position) information |

A configuration of the channel position descriptor according to the present exemplary embodiment may be represented in Table 6.

TABLE 6

| Name of Descriptor | Subject of Description | Example |
|---|---|---|
| Allocation number | Allocation number | 1; first channel |
| Spatial position data | Azimuth angle | 000: center of screen, 060: 60-degrees) |
| | Elevation angle | 000: position of listener's ear height, 060: 60-degrees) |
| Distance position data | distance | 3: 3 meter |
| Tolerance of Spatial position | horizontal tolerance | 10: ±10 degrees, 15: ±15 degrees |
| | vertical tolerance | 10: ±10 degrees, 15: ±15 degrees |
| | Moving Information of time | Information for moving objects: especially Time information |
| Tolerance of Distance position | distance | 3: 3 meter |
| | Moving Information of position | Information for moving objects: especially Position information |
| Type (Characteristics) of channel component object | Nominal frequency Range | Full: general channel, LFE: Low frequency effect channel |
| | Type of channel component directivity | /Direct/Diffuse/Surround |

The following is an example of a configuration of a descriptor for describing a multichannel audio signal in a 22.2 channel.

<Embodiment 1>

| (A) Sound Essence descriptors | |
|---|---|
| Program name | sample 22.2ch |
| Type of Sound essence (Sound-field) | complete mix |
| Name of Sound-field configuration (channel arrangement index) | 22.2ch |
| Loudness value | −24.0 LKFS |

| (B) Sound-field configuration descriptors | | |
|---|---|---|
| Name of Sound-field configuration | | 22.2ch |
| The number of channels | | 24 |
| Others* | Down-mixing coefficient | Null |

(C) Sound Channel descriptors

Indicator of Sound Channel descriptor: On/On

| Allocation number | Channel label | Channel component type | Spatial position data | Distance data | Tolerance level of Spatial position | Tolerance level of Distance |
|---|---|---|---|---|---|---|
| 1 | FL | Full | (310, 0) | Null | (10, 5) | Null |
| 2 | FR | Full | (50, 0) | Null | (10, 5) | Null |
| 3 | FC | Full | (0, 0) | Null | (5, 5) | Null |
| 4 | L | LFE | (300, −30) | Null | (30, 10) | Null |
| 5 | BL | Full | (225, 0) | Null | (15, 15) | Null |
| 6 | BR | Full | (135, 0) | Null | (15, 15) | Null |
| 7 | FLc | Full | (335, 0) | Null | (10, 5) | Null |
| 8 | FRc | Full | (25, 0) | Null | (10, 5) | Null |
| 9 | BC | Full | (180, 0) | Null | (10, 5) | Null |
| 10 | R | LFE | (60, −30) | Null | (30, 10) | Null |
| 11 | SiL | Full | (270, 0) | Null | (10, 5) | Null |
| 12 | SiR | Full | (90, 0) | Null | (10, 5) | Null |
| 13 | TpFL | Full | (310, 40) | Null | (10, 10) | Null |
| 14 | TpFR | Full | (50, 40) | Null | (10, 10) | Null |
| 15 | TpFC | Full | (0, 40) | Null | (5, 10) | Null |
| 16 | TpC | Full | (Null, 90) | Null | (10, 15) | Null |
| 17 | TpBL | Full | (225, 40) | Null | (15, 10) | Null |
| 18 | TpBR | Full | (135, 40) | Null | (15, 10) | Null |
| 19 | TpSiL | Full | (270, 40) | Null | (10, 10) | Null |
| 20 | TpSiR | Full | (90, 40) | Null | (10, 10) | Null |
| 21 | TpBC | Full | (180, 40) | Null | (10, 10) | Null |
| 22 | BtFC | Full | (0, −30) | Null | (5, 10) | Null |
| 23 | BtFL | Full | (310, −30) | Null | (10, 10) | Null |
| 24 | BtFR | Full | (50, −30) | Null | (10, 10) | Null |

<Embodiment 2>

| (A) Sound Essence descriptors | |
|---|---|
| Program name | sample 22.2ch |
| Type of Sound essence (Sound-field) | complete mix |
| Name of Sound-field configuration (channel arrangement index) | 22.2ch |
| Loudness value | −24.0 LKFS |

| (B) Sound-field configuration descriptors | | |
|---|---|---|
| Name of Sound-field configuration | | 22.2ch |
| The number of channels | | 24 |
| multichannel sound arrangement description | | middle: 10, front: 5, side: 2, back: 3, top: 9, front: 3, side: 3, back: 3, bottom: 3, front: 3, side: 0, back: 0, LFE: 2 |
| List of channel allocation | | 01: FL, 02: FR, 03: FC, 04: L_LFE, 05: BL, 06: BR, 07: FLc, 08: FRc, 09: BC, 10: R_LFE, 11: SiL, 12: SiR, 13: TpFL, 14: TpFR, 15: TpFC, 16: TpC, 17: TpBL, 18: TpBR, 19: TpSiL, 20: TpSiR, 21: TpBC, 22: BtFC, 23: BtFL, 24: BtFR |
| Others* | Down-mixing coefficient | Null |

(C) Sound Channel descriptors

| Indicator of Sound Channel descriptor | | | | | | On/On |
|---|---|---|---|---|---|---|

| Allocation number | Channel label | Channel component type | Spatial position data | Distance data | Tolerance level of Spatial position | Tolerance level of Distance |
|---|---|---|---|---|---|---|
| 1 | FL | Full | (310, 0) | Null | (10, 5) | Null |
| 2 | FR | Full | (50, 0) | Null | (10, 5) | Null |
| 3 | FC | Full | (0, 0) | Null | (5, 5) | Null |
| 4 | L | LFE | (300, −30) | Null | (30, 10) | Null |
| 5 | BL | Full | (225, 0) | Null | (15, 15) | Null |
| 6 | BR | Full | (135, 0) | Null | (15, 15) | Null |
| 7 | FLc | Full | (335, 0) | Null | (10, 5) | Null |
| 8 | FRc | Full | (25, 0) | Null | (10, 5) | Null |
| 9 | BC | Full | (180, 0) | Null | (10, 15) | Null |
| 10 | R | LFE | (60, −30) | Null | (30, 10) | Null |
| 11 | SiL | Full | (270, 0) | Null | (10, 5) | Null |
| 12 | SiR | Full | (90, 0) | Null | (10, 5) | Null |
| 13 | TpFL | Full | (310, 40) | Null | (10, 10) | Null |
| 14 | TpFR | Full | (50, 40) | Null | (10, 10) | Null |
| 15 | TpFC | Full | (0, 40) | Null | (5, 10) | Null |
| 16 | TpC | Full | (Null, 90) | Null | (10, 15) | Null |
| 17 | TpBL | Full | (225, 40) | Null | (15, 10) | Null |
| 18 | TpBR | Full | (135, 40) | Null | (15, 10) | Null |
| 19 | TpSiL | Full | (270, 40) | Null | (10, 10) | Null |
| 20 | TpSiR | Full | (90, 40) | Null | (10, 10) | Null |
| 21 | TpBC | Full | (180, 40) | Null | (10, 10) | Null |
| 22 | BtFC | Full | (0, −30) | Null | (5, 10) | Null |
| 23 | BtFL | Full | (310, −30) | Null | (10, 10) | Null |
| 24 | BtFR | Full | (50, −30) | Null | (10, 10) | Null |

A next-generation multichannel audio signal may be utilized in a next-generation audio/video (A/V) system, such as an ultra high definition television (UHDTV) in households, other nations, and studios, through such a scheme for describing descriptors.

The bitstream generator 230 may generate a descriptor and a multichannel audio signal in a form of a bitstream. The bitstream generator 230 may encode and multiplex a descriptor multichannel audio signal to generate a bitstream.

The transmitter 240 may transmit the generated bitstream to an apparatus for playing audio data.

Figure 3:
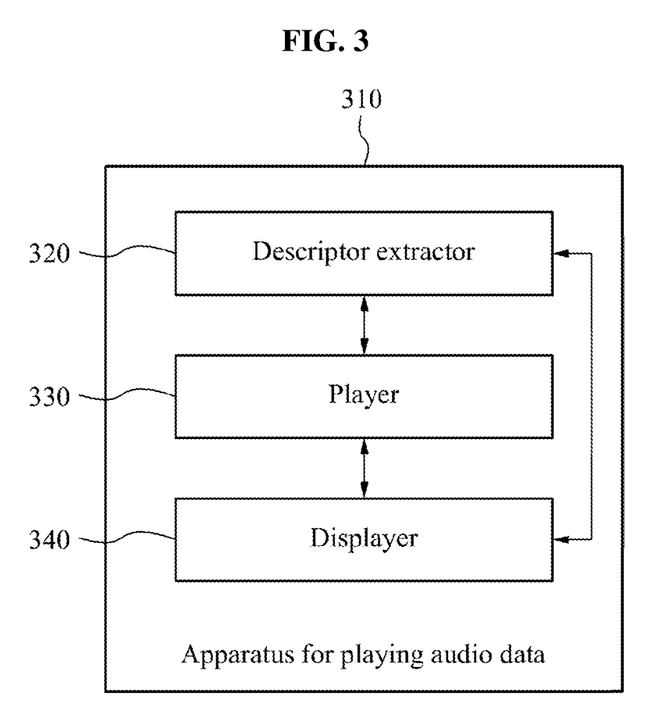
FIG. 3 is a diagram illustrating a detailed configuration of an apparatus for playing audio data according to an embodiment of the present invention.

FIG. 3 is a diagram illustrating a detailed configuration of an apparatus 310 for playing audio data according to an embodiment of the present invention.

Referring to FIG. 3, the apparatus 310 for playing the audio data may include a descriptor extractor 320 and a player 330. The apparatus 310 for playing the audio data may further include a displayer 340.

The descriptor extractor 320 may extract a descriptor associated with a multichannel audio signal from a bitstream generated by an apparatus for generating audio data. The descriptor extractor 320 may extract a descriptor from a header of a multichannel audio format signal, or a header of a plurality of audio channels configuring a multichannel audio signal. The descriptor may include information associated with a position at which an audio signal included in the multichannel audio signal is played. The descriptor may include at least one of a sound essence descriptor, a sound-field configuration descriptor, and a sound channel descriptor. For detailed descriptions of the descriptor, reference may be made to analogous features provided with reference to FIG. 2.

The player 330 may play a multichannel audio signal, based on the extracted descriptor. The player 330 may play a multichannel audio signal, based on play information of a multichannel audio signal described in the descriptor. By way of example, the player 330 may render a plurality of audio signals included in a multichannel audio signal, based on play position information included in the descriptor.

The player 330 may perform down-mixing on the multichannel audio signal, based on play conditions information of the apparatus 310 for playing the audio data. For example, the player 330 may perform down-mixing on audio data of a 22.2 channel to audio data of a 10.2 channel in order to play the audio data mixed to the 22.2 channel in the apparatus 310 for playing the audio data of 10.2 channel conditions. The play conditions information may include information associated with channel conditions of the apparatus 310 for playing the audio data, loud speaker arrangement, and the like.

The displayer 340 may display, on a screen, information included in metadata or information included in the descriptor. For example, the displayer 340 may display play position information of an audio signal, identifier information of an audio signal currently being played, and the like.

Figure 4:
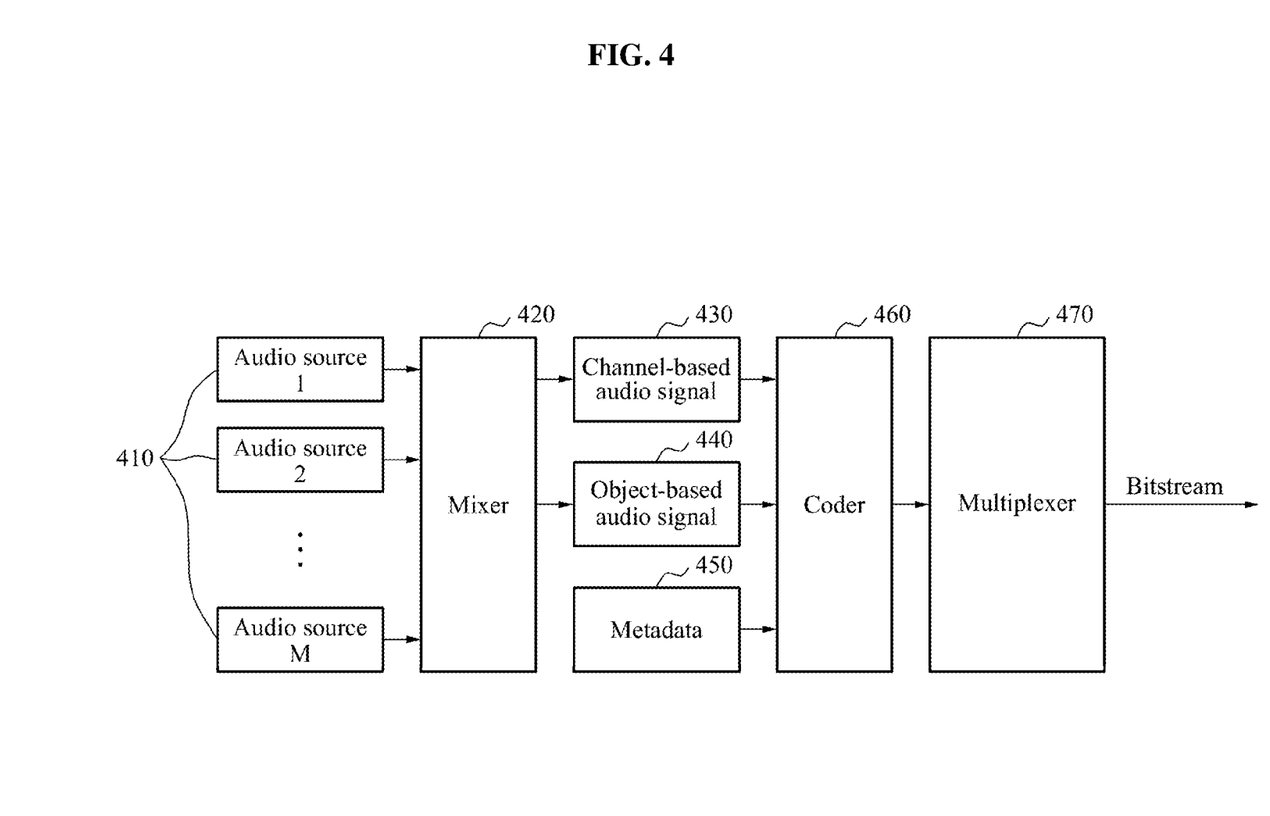
FIG. 4 is a diagram illustrating an example of generating audio data according to an embodiment of the present invention.

FIG. 4 is a diagram illustrating an example of generating audio data according to an embodiment of the present invention.

An apparatus for generating audio data may generate audio data, based on a descriptor of a basic structure, such that a receiver for receiving audio data may readily perform correction, conversion, exchange, and the like, on an audio signal. The apparatus for generating the audio data may store descriptor information in a header of a multichannel audio format signal, or a header of a plurality of audio channels configuring a multichannel, and transmit the descriptor information to the receiver.

The apparatus for generating the audio data may include a mixer 420, a coder 460, and a multiplexer 470. The mixer 420 may mix several audio sources 410, and output a channel-based audio signal 430 and an object-based audio signal 440. The coder 460 may code metadata 450 including the descriptor and a multichannel audio signal. The multichannel audio signal may include the channel-based audio signal 430 and the object-based audio signal 440. The descriptor may include information indicating a configuration of a multichannel The multichannel coder 460 may code an audio signal and a descriptor separately through various schemes, or code the audio signal and the descriptor together. The multiplexer 470 may generate a bitstream through multiplexing the coded multichannel audio signal and the metadata 450.

Figure 5:
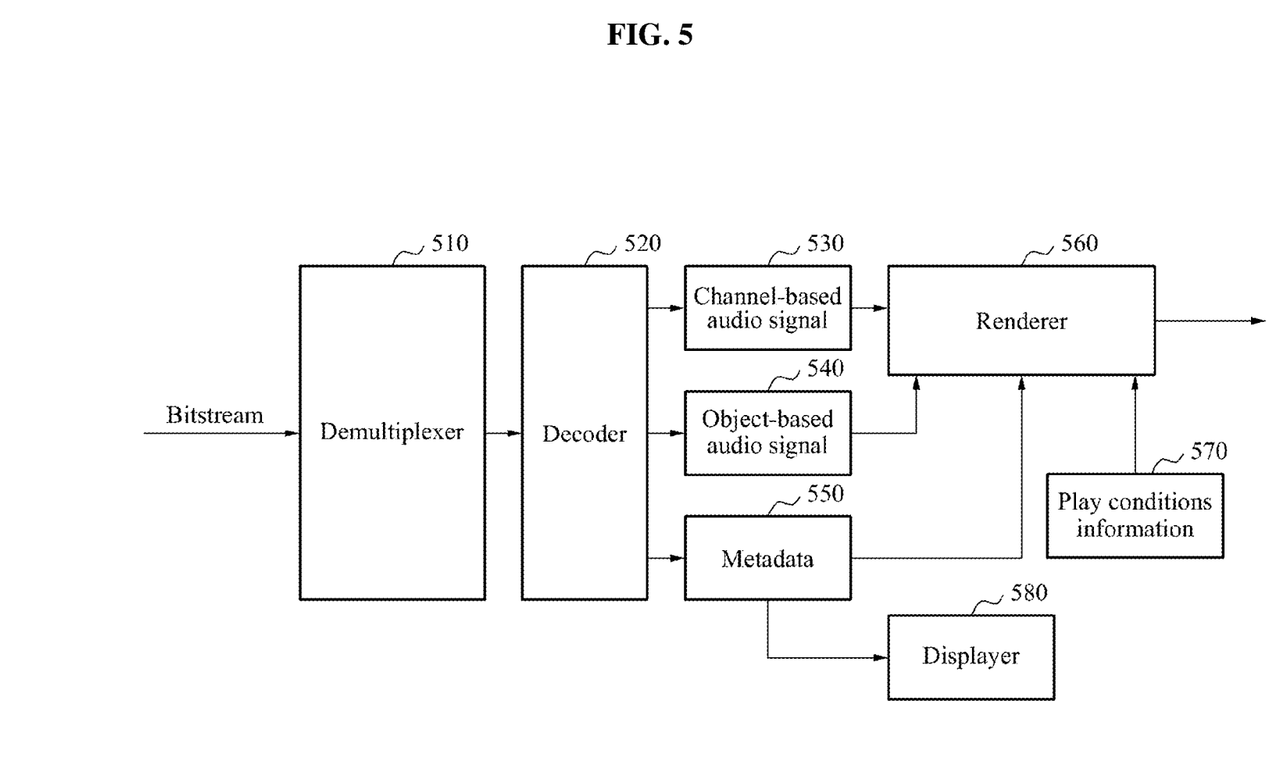
FIG. 5 is a diagram illustrating an example of playing audio data according to an embodiment of the present invention.

FIG. 5 is a diagram illustrating an example of playing audio data according to an embodiment of the present invention.

An apparatus for playing audio data may include a demultiplexer 510, a decoder 520, a renderer 560, and a displayer 580.

The demultiplexer 510 may perform demultiplexing on a received bitstream. The decoder 520 may decode the demultiplexed bitstream, and output a multichannel audio signal and metadata 550 to the renderer 560. The multichannel audio signal may include a channel-based audio signal 530 and an object-based audio signal 540. The renderer 560 may play a multichannel audio signal, based on the metadata 550. The renderer 560 may play a multichannel audio signal, based on information associated with a loudspeaker arrangement or information on a position of the object-based audio signal 540. The information associated with the loudspeaker arrangement or the information on the position of the object-based audio signal 540 may be input to the apparatus for playing the audio data.

A multichannel audio signal may be played based on the play conditions information 570 of the apparatus for playing the audio data. The apparatus for playing the audio data may play an original multichannel audio signal or perform down-mixing on a multichannel audio signal, based on play conditions of the apparatus for playing the audio data. The multichannel audio signal may be played in conformity to the play conditions of the apparatus for playing the audio data.

An example in which the apparatus for playing the audio data performs down-mixing on a signal produced in a 22.2 channel in an initial mixing step to match a 10.2 channel structure of play conditions may be represented in Table 7. Additionally, a down-mixing coefficient descriptor may describe conversion among various multichannels.

TABLE 7

| 10.2 channel signal | Combination of 22.2 channel signals |
| --- | --- |
| L | FL + BtFL(−6 dB) + FLc |
| C | FC + BtFC(−6 dB) |
| R | FR + BtFR(−6 dB) + FRc |
| LS | −3 dB(TpSiL + SiL) + TpC(−3 dB) |
| RS | −3 dB(TpSiR + SiR) + TpC(−3 dB) |
| LB | BL + BC(−3 dB) |
| RB | BR + BC(−3 dB) |
| LH | TpFL + TpFC(−3.5 dB) |
| RH | TpFR + TpFC(−3.5 dB) |
| CH | −3 dB(TpBL + TpBR) + TpBC |
| LFE1 | LFE1 |
| LFE2 | LFE2 |

The renderer 560 may play audio signals configuring a multichannel audio signal, based on azimuth angle and elevation angle information set forth in spatial position data, in a sequence of a channel according to an allocation number, as defined in channel position data of a descriptor. The renderer 560 may play an object-based audio signal 540, based on sound image localization information based on a play time of content, described in a type of a channel component object. For example, a user may randomly control a spatial position at which the object-based audio signal 540 is played.

The displayer 580 may display, on a screen, information described in a descriptor. The user may verify flexibility of speaker arrangement conditions of the user, compared to an optimal play position, based on information on a tolerance of spatial position of a descriptor, and verify name information of individual channels, based on channel label information of the descriptor. When the object-based audio signal 540 is included in a multichannel audio signal, the user may verify a sound of a corresponding object-based audio signal, via an object channel label of a channel label.

Figure 6:
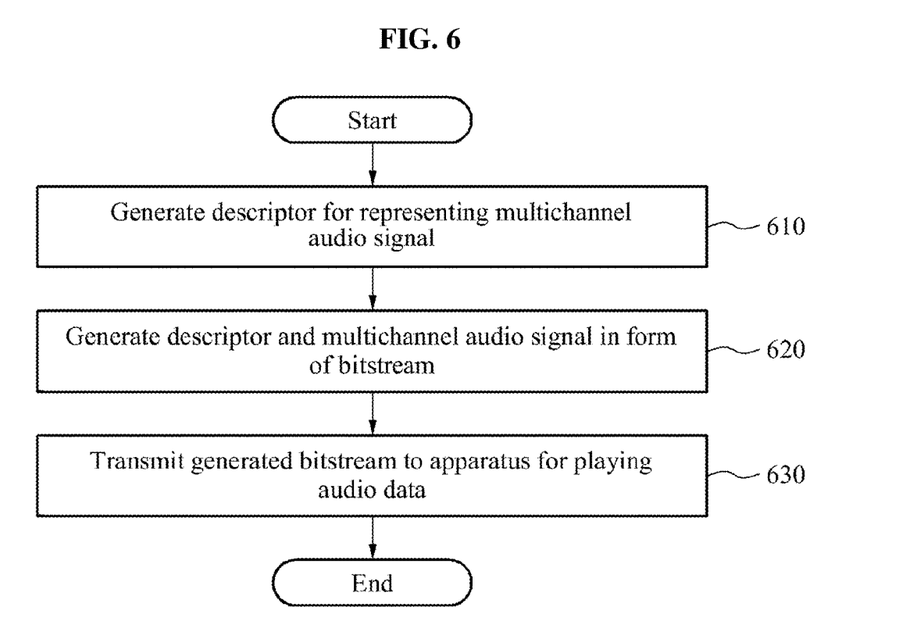
FIG. 6 is a diagram illustrating an operation of a method for generating audio data according to an embodiment of the present invention.

FIG. 6 is a diagram illustrating an operation of a method for generating audio data according to an embodiment of the present invention.

In operation 610, an apparatus for generating audio data may generate a descriptor for displaying a multichannel audio signal. The descriptor may include information associated with a position at which an audio signal included in the multichannel audio signal is played. The apparatus for generating the audio data may store the generated descriptor in a header of a multichannel audio format signal, using metadata, or in a header of a plurality of audio channels configuring the multichannel audio signal. The descriptor may include at least one of a sound essence descriptor, a sound-field configuration descriptor, and a sound channel descriptor.

In operation 620, the apparatus for generating the audio data may generate a descriptor and a multichannel audio signal in a form of a bitstream. The apparatus for generating the audio data may encode and multiplex the descriptor and the multichannel audio signal to generate a bitstream.

In operation 630, the apparatus for generating the audio data may transmit the generated bitstream to an apparatus for playing audio data.

Figure 7:
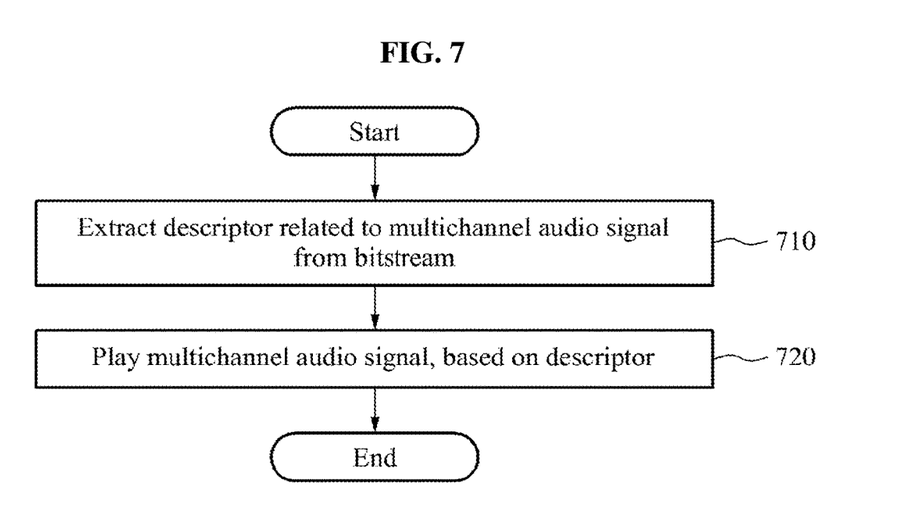
FIG. 7 is a diagram illustrating an operation of a method for playing audio data according to an embodiment of the present invention.

FIG. 7 is a diagram illustrating an operation of a method for playing audio data according to an embodiment of the present invention.

In operation 710, an apparatus for playing audio data may extract a descriptor for displaying a multichannel audio signal from a bitstream generated by an apparatus for generating audio data. The apparatus for playing the audio data may extract a descriptor from a header of a multichannel audio format signal, or a header of a plurality of audio channels configuring the multichannel audio signal.

In operation 720, the apparatus for playing the audio data may play a multichannel audio signal, based on the extracted descriptor. The apparatus for playing the audio data may play the multichannel audio signal, based on play information of the multichannel audio signal described in the descriptor. The apparatus for playing the audio data may render a plurality of audio signals included in the multichannel audio signal, based on play position information included in the descriptor. The apparatus for playing the audio data may perform down-mixing on the multichannel audio signal, based on play conditions information, such as information on channel conditions of the apparatus for playing the audio data, information on loudspeaker arrangement, and the like.

According to the present exemplary embodiment, the apparatus for playing the audio data may display information included in metadata or the descriptor. The apparatus for playing the audio data may display information based on a position at which an audio signal is played, information on an identity of an audio signal currently being played, and the like.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of playing audio data, the method comprising:
   receiving a multi-channel audio signal related to channel audio signal and object audio signal;
   identifying information for the multi-channel audio signal;
   reproducing the multi-channel audio signal based on the information,
   wherein the information includes:
   (i) information related to the number of channels, channel label, and spatial position of channel,
   (ii) information related to a distance from a center of an audio signal playing space to a position where the multi channel audio signal is played in the audio signal playing space,
   (iii) information related to time and position determined based on moving of object audio signals.

2. The method of claim 1, wherein the information includes at least one of sound channel, channel position, type of sound channel component object, sound-field configuration, sound-field, and sound essence.

3. The method of claim 2, wherein the sound essence includes at least one of program title, name of type and content of sound essence, name of multichannel sound arrangement or configuration, and loudness value.

4. The method of claim 2, wherein the sound field includes at least one of name of multichannel sound arrangement, total number of channel, numbers of horizontal and/or vertical channels, mapping of channel allocation, and coefficients for down-mixing.

5. The method of claim 2, wherein the sound channel includes at least one of channel label data and channel position data.

6. The method of claim 2, wherein the channel label includes at least one of horizontal channel label, vertical channel label, distance channel label, and object channel label.

7. The method claim 2, wherein the channel component object includes at least one of nominal frequency range, type of channel component directivity, and moving information of the object.

8. The method of claim 2, wherein the channel position includes at least one of spatial position data, distance position data, tolerance of spatial position, tolerance of distance position, and characteristics of channel component object.

9. Apparatus of playing audio data, the apparatus comprising:
   one or more processor configured to:
   receive a multi-channel audio signal related to channel audio signal and object audio signal;
   identify information for the multi-channel audio signal;
   reproduce the multi-channel audio signal based on the information,
   wherein the information includes
   (i) information related to the number of channels, channel label, and spatial position of channel,
   (ii) information related to a distance from a center of an audio signal playing space to a position where the multi channel audio signal is played in the audio signal playing space,
   (iii) information related to time and position determined based on moving of object audio signals.

10. The apparatus of claim 9, wherein the information includes at least one of sound channel, channel position, type of sound channel component object, sound-field configuration, sound-field, and sound essence.

11. The apparatus of claim 10, wherein the sound essence includes at least one of program title, name of type and content of sound essence, name of multichannel sound arrangement or configuration, and loudness value.

12. The apparatus of claim 10, wherein the sound field includes at least one of name of multichannel sound arrangement, total number of channel, numbers of horizontal and/or vertical channels, mapping of channel allocation, and coefficients for down-mixing.

13. The apparatus of claim 10, wherein the sound channel includes at least one of channel label data and channel position data.

14. The apparatus of claim 10, wherein the channel label includes at least one of horizontal channel label, vertical channel label, distance channel label, and object channel label.

15. The apparatus claim 10, wherein the channel component object includes at least one of nominal frequency range, type of channel component directivity, and moving information of the object.

16. The apparatus of claim 10, wherein the channel position includes at least one of spatial position data, distance position data, tolerance of spatial position, tolerance of distance position, and characteristics of channel component object.

\* \* \* \* \*